Patented Mar. 3, 1953

2,630,421

UNITED STATES PATENT OFFICE 2,630,421

STABILIZATION OF POLYAMIDES

Gelu S. Stamatoff, Newark, Del., assignor to E. I. du Pont de Nemours and Company, Wilmington, Del., a corporation of Delaware No Drawing. Application January 24, 1951, Serial No. 207,655

19 Claims. (Cl. 260—45.8)

This invention relates to synthetic linear polyamides and more particularly to the stabilization of synthetic linear polyamides against atmospheric degradation at elevated temperatures.

The polymers of the nylon type, that is, the macromolecular synthetic linear polyamides prepared from polymerizable mono-amino-carboxylic acids or their amide-forming derivatives, or from suitable diamines and suitable dicarboxylic acids or amide-forming derivatives of these compounds, possess a number of physical properties such as great toughness and high tensile strength which make them of great value in many applications. Preparation and use of such polymers are illustrated in U. S. Patents 2,071,250, 2,071,253 and 2,130,948. The polyamides described in these patents are high molecular weight polymers which as a class are micro-crystalline in structure. In general, these polyamides have intrinsic viscosities above 0.4 where intrinsic viscosity is defined, as in U. S. Patent 2,130,948.

Synthetic linear polyamides when exposed to the atmosphere at elevated temperatures undergo degradation which impairs those physical properties responsible for the toughness and flexibility characteristics of such substances. In addition, these polyamides are badly discolored by prolonged exposure to atmospheric conditions, i. e., heat and light. The resulting brittleness and discoloration materially affects the utility of objects containing synthetic linear polyamides in certain applications, viz. electrical insulation, transparent films, bristles, cloth, coated fabrics and the like, where much dependence is placed upon maximum retention of toughness, flexibility, and original color during fabrication and service.

It is an object of this invention to stabilize the said high molecular weight synthetic linear polyamides against degradation, i. e. embrittlement and/or discoloration, that is encountered upon exposure to elevated temperatures, particularly under atmospheric conditions. Other objects will be apparent from the hereinafter description of the subject invention.

The objects of this invention are accomplished by incorporating in a synthetic linear polyamide a small amount of a 2-mercaptobenzimidazole stabilizer. More particularly, from 0.1% to 2% of 2-mercaptobenzimidazole, based upon the weight of polyamide, is incorporated with the synthetic linear polyamide. In a more specific embodiment a greater improvement in the color stability of a nylon can be obtained by incorporating therein a small amount of 2-mercaptobenzimidazole, and a small quantity of a phosphorus compound from the group consisting of phosphorus acids, their esters and salts, especially the salts having cationic radicals whose hydroxides are alkaline. The phosphorus compound is suitably introduced by carrying out the polyamide formation in the presence thereof. Particular phosphorus compounds which have been found to be effective include the phosphorus acids (phosphoric, phosphorous, etc.) and also sodium and potassium phosphites and phosphates; methyl, ethyl, propyl and butyl phosphites and phosphates; triphenyl phosphite and phosphate; and various phosphites and phosphates. More particularly, from 0.1% to 2% of 2-mercaptobenzimidazole, based upon the weight of polyamide, and from 0.1% to 1% of the phosphorus compound, based upon the weight of polyamide, are employed in this manner. In a still more specific embodiment, a further improvement is achieved by employing also a halogen compound in combination with the foregoing ingredients; especially effective for this purpose are the halogen compounds of the group consisting of hydrogen halide acids, alkali metal halides, alkaline-earth metal halides and ammonium halides, in which the halogen is a member of the class consisting of chlorine, bromine and iodine. The quantity of halogen compound should be from 0.05% to 2% of the weight of the polyamide.

The present invention resides in the discovery that incorporation of a small amount of 2-mercaptobenzimidazole with a synthetic linear polyamide decreases embrittlement and/or discoloration of synthetic linear polyamides upon exposure to general atmospheric conditions, especially at elevated temperatures.

The following examples, in which all parts are by weight unless otherwise specified, are illustrative of various embodiments of the present invention.

*Example 1.*—The following materials were added to a 30-gallon kettle in the following order with stirring:

| | Parts |
|---|---|
| Distilled water | 16,000 |
| Adipic acid | 7,900 |
| 80% hexamethylene-diamine | 7,810 |

The temperature of the above solution was maintained between 40° to 50° C. by circulating cooling water through the jacket of the kettle. To the kettle were added 70 parts of a decolorizing carbon, and the pH of the solution was adjusted to 6.95 ± 0.05 by suitable addition of adipic acid or diamine. The solution was then filtered using 25 parts of a hydrated amorphous silica on the filter and 100 parts of the silica in the solution. To an autoclave were added 26,000 parts of this salt (i. e., polyhexamethylene diamine adipate) solution (salt content, 46.8% by weight) and the air in the autoclave was replaced by nitrogen by evacuating to 25 mm. and refilling with nitrogen to 50 p. s. i. twice. The autoclave was again evacuated to about 25 mm. and the salt solution was vacuum-distilled to produce approximately 8,000 parts of distillate. At this point the temperature of the salt in the autoclave was 50° to 55° C. The vacuum was cut off, the autoclave was refilled with nitrogen, and the following stabilizer composition was added to the autoclave:

| | Parts |
|---|---|
| Water | 300 |
| 2-mercaptobenzimidazole | 25 |
| Phosphorous acid | 25 |

The autoclave was closed, evacuated, and refilled with nitrogen twice. The nitrogen pressure was adjusted to about 10 p. s. i. and condensation was carried out as follows:

| Operation | Time (hrs.) | Temperature, °C. |
|---|---|---|
| Heating up to 250 p. s. i | 1 | 55–212 |
| Heating at 250 p. s. i. and steam bleeding | 3¾ | 212–250 |
| Pressure reduction | 2 | 250–272 |
| Hold with slow nitrogen stream | ½ | 272–275 |

The amount of 2-mercaptobenzimidazole and phosphorous acid were each 0.25 parts per 100 parts of the polyamide. The polyamide melt, thus obtained, was extruded at 275° C. during a period of one hour, through an orifice having a diameter of 0.2 inch, and the product was cut into molding powder. The stability of the polymer against discoloration was determined in accordance with the following test:

Twenty-five parts of the molding powder was dried in a mechanical convection oven at 120° C. for 4 hours. The degree of discoloration was determined with a standard Beckmann spectrophotometer by measuring the transmittance of a 5% solution of the polymer in 95% formic acid of wave lengths of 400 and 560 millimicrons.

$$\text{Color factor} = \frac{\text{Transmittance at 400 millimicrons} - \text{Transmittance at 560 millimicrons}}{(\text{cell length in centimeters}) \times (\text{concentration of polymer in solution})} \times 100$$

The color factor for the polymer of this example was 6. The color factor of the same polymer not dried for 4 hours at 120° C. was 0. The stability of the polymer against embrittlement upon exposure to elevated temperatures was determined in accordance with the following test:

The polymer powder was dried in a mechanical convection oven at 120° C. for 4 hours. The powder was then extruded through a screw stuffing machine into the form of a filament 0.040 inch in diameter. The filament was then wrapped in the form of a coil and suspended in an oven at 150° C. From time to time a specimen of the filament was taken out of the oven and cooled in desiccator. After cooling, the filament specimen was wrapped tightly around a wire 0.040 inch in diameter to test the flexibility thereof. The minimum heating time at which the filament could not be wrapped around the wire 5 times without breakage, expressed in hours, was the measure of heat stability. The heat stability of the polymer stabilized in accord with this example was about 80 hours.

*Example 2.*—In a series of tests, polyhexamethyleneadipamide was stabilized by the method of Example 1, using the quantities of stabilizers set forth in Table I. The results set forth in the table were obtained.

TABLE I

*Stabilization of polyhexamethyleneadipamide with 2-mercaptobenzimidazole*

| 2-Mercaptobenzimidazole (percent by weight of polyamide) | Phosphorus Compound | Percent of Phosphorus Compound (by weight of polyamide) | Color factor | | Heat Stability (Hours at 150° in air) |
|---|---|---|---|---|---|
| | | | Not dried | Dried at 120° C. for 4 hours | |
| 0 | None | 0 | 13 | 100 | 2 |
| 1 | do | 0 | 19 | 105 | 300 |
| 0 | Phosphorous Acid | 0.5 | 0 | 40 | |
| 1 | do | 0.25 | 0 | 25 | 310 |
| 0.1 | do | 0.5 | 0 | 25 | |
| 0.2 | do | 0.1 | 5 | 30 | |
| 0.25 | do | 0.25 | 0 | 6 | |
| 0.25 | do | 0.25 | 0 | 0 | |
| 0 | Triphenyl Phosphite | 0.25 | 0 | 66 | |
| 0.5 | Monosodium Phosphite | 0.25 | 0 | 5 | |
| 0.25 | Triphenyl Phosphite | 0.25 | 0 | 25 | |
| 0.25 | Phosphoric Acid | 0.5 | 3.2 | 26 | |

*Example 3.*—In a series of tests various polyamides were stabilized with 2-mercaptobenzimidazole by the method of Example 1, with the results as set forth in the following table.

TABLE II

*Stabilizing effect of 2-mercaptobenzimidazole on various synthetic linear polyamides*

| Polyamide | 2-Mercaptobenzimidazole (Percent by weight of polyamide) | Phosphorus Compound (Percent by weight of polyamide) | Color Factor | | Heat stability (Hours at 150° in air) |
|---|---|---|---|---|---|
| | | | Not dried | Dried at 120° C. for 4 hours | |
| Polyhexamethylene sebacamide | 0 | 0 | 23 | 85 | 0.5 |
| Do | 0.1 | 0 | 22 | 25 | |
| Do | 0.25 | 0 | 21 | 26 | 80 |
| Do | 1 | 0 | 20 | 25 | 340 |
| Do | 1 | (¹) | 10 | 25 | 600 |
| Polymer formed by reaction of adipic acid and the mixed stereoisomers of di(p-aminocyclohexyl) methane | 0 | 0 | 20 | 38 | |
| Do | 0.25 | 0 | 7 | 16 | |

¹ Phosphorous acid—0.25.

*Example 4.*—The following materials were added to a 30-gallon kettle in the following order with stirring:

| | Parts |
|---|---|
| Distilled water | 16,000 |
| Adipic acid | 7,900 |
| 80% hexamethylenediamine | 7,810 |

The temperature of the above solution was maintained between 40° to 50° C. by circulating cooling water through the jacket of the kettle. To the kettle were added 70 parts of a decolorizing carbon, and the pH of the solution was adjusted to between 6.9 and 7.0 by suitable addition of adipic acid or diamine. The solution was then filtered using 25 parts of a hydrated amorphous silica on the filter and 100 parts of the silica in the solution. To an autoclave were added 26,000 parts of the above salt solution and the following stabilizer mixture was added:

| | Parts |
|---|---|
| 2-mercaptobenzimidazole | 100 |
| Potassium bromide | 100 |
| Phosphorous acid | 25 |

The amounts of 2-mercaptobenzimidazole, potassium bromide and phosphorous acid, based upon the stoichiometric weight of polyamide to be produced were 1%, 1% and 0.25% respectively. The air in the autoclave was replaced with nitrogen by evacuating 25 mm. and refilling with nitrogen to 50 p. s. i. three times. The salt in the autoclave was concentrated by vacuum distillation, forming approximately 8,000 parts of distillate. At this point the temperature of the salt in the autoclave was 50° to 55° C. The vacuum was cut off and the autoclave was refilled with nitrogen up to 10 p. s. i. The autoclave was closed and polymerization was carried out as follows:

| Operation | Time (hrs.) | Temperature, °C. |
|---|---|---|
| Heating up to 250 p. s. i. | 1 | 55–212 |
| Heat at 250 p. s. i. bleed steam | 3¾ | 215–250 |
| Reduce pressure to zero | 1 | 250–275 |
| Pass slow nitrogen stream to autoclave | 1 | 275 |
| Close autoclave and increase nitrogen pressure to 100 p. s. i. | | 275 |

The resulting polyamide melt was extruded at 275° C. through a 0.2 inch orifice and the extruded polymer was quenched in water. Some of the 0.2 inch beading was cut into molding powder. It had a color factor between 0 and 10 after heating in an air oven at 120° C. for 4 hours. The stability of the polymer against embrittlement upon exposure to elevated temperatures was determined in accordance with the following test: The polymer powder was dried in a mechanical convection oven at 120° C. for 4 hours. The powder was then extruded into the form of a filament 0.04 inch in diameter. The filament was wrapped in the form of a coil and suspended in an oven at 150° C., and tested for heat stability as described in Example 1. By this test the polymer had a heat stability of 1420 hours.

In addition to the measure of heat stability in the presence of air at 150° C. another test was used to measure heat stability; this test comprised heating a coil of filament about 0.040 inch in diameter at a temperature of 105° C. in an atmosphere of pure oxygen. From time to time, as in the above described test, specimens of filament were dried in a desiccator and tested in the manner described above. The polymer had a stability of over 5000 hours.

A sample of the 0.04 inch beading was tested for cold-drawing properties. This beading was readily cold-drawn by hand at room temperature. A comparison was made with beading extruded from unmodified polyamides and samples of commercially available nylon molding powders; none of the beading (0.04 inch in diameter) extruded from unmodified polymer or commercially available molding powder could be readily cold-drawn by hand at room temperature.

*Example 5.*—The following table records color and heat stability of synthetic linear polyamides stabilized with various compositions incorporated therewith as illustrated in Example 1.

TABLE III

*Stabilization of polyamides with 2-mercaptobenzimidazole, a phosphorus compound and a halogen compound*

| Polyamide | 2-Mercaptobenzimidazole (percent by weight of polyamide) | Phosphorus Compound (percent by weight of polyamide) | Halogen Compound (percent by weight of polyamide) | Heat Stability (Hours at 150° C. in air) | Heat Stability (Hours at 105° C. in oxygen) | Color Factor Not dried | Color Factor Dried at 120° C. for 4 hours |
|---|---|---|---|---|---|---|---|
| Polyhexamethylene Adipamide | 0 | 0 | 0 | 2 | 4 | 13 | 100 |
| Do | 1 | 0 | 0 | 300 | 5,600 | | |
| Do | 0 | 0 | KI—0.5 | less than 65 | | 10 | 70 |
| Do | 1 | H₃PO₃—0.25 | | 300 | 4,000 | | |
| Do | 1 | 0 | KI—1 | 600 | 2,000 | | |
| Do | 0.25 | 0 | KI—0.25 | 300 | 1,500 | | |
| Do | 1 | H₃PO₃—0.25 | KI—1 | 820 | 5,000+ | 0.5 | 0-10 |
| Do | 1 | H₃PO₃—0.25 | KI—0.25 | 480 | 5,000+ | 0.5 | 0-10 |
| Do | 1 | H₃PO₃—0.25 | KI—0.50 | 700 | 5,000+ | 0.5 | 0-10 |
| Do | 0.25 | H₃PO₃—0.25 | KI—0.25 | 310 | 5,000+ | 0.5 | 0-10 |
| Do | 1 | H₃PO₃—0.25 | KI—0.10 | 310 | 5,000+ | 0.5 | 0-10 |
| Do | 1 | H₃PO₃—0.25 | KBr—1 | 1,420 | 5,000+ | 0.5 | 0-10 |
| Do | 1 | H₃PO₃—0.25 | NaCl—1 | 550 | 5,000+ | 0.5 | 0-10 |
| Do | 1 | H₃PO₃—0.25 | KI—2 | 650 | 5,000+ | 0.5 | 0-10 |
| Do | 1 | H₃PO₃—0.25 | KBr—2 | 1,000 | 5,000+ | 0.5 | 0-10 |
| Polyhexamethylene Sebacamide | 1 | H₃PO₃—0.25 | NH₄I—0.25 | 880 | 5,000+ | 0.5 | 0-10 |
| Do | 1 | H₃PO₃—0.25 | KI—0.25 | 700 | 5,000+ | 0.5 | 0-10 |

The above examples should not be regarded as limiting the invention, since numerous other embodiments will occur to those who are skilled in the art. For instance, the alkaline earth metal halides can be substituted for the alkali metal halides in the illustration given. Moreover, while the stabilizer of the present invention is added preferably to at least one of the polyamide ingredients prior to the polymerization reaction, it may be added to the condensing reactants at any time during the polymerization. Addition of the stabilizer to the molten polymer followed by homogenization by extrusion is also within the scope of the present invention. Blending of the stabilizer with solid particles of polyamide, i. e., molding powder, in a tumbler followed by extrusion of the solid particles is also a satisfactory method of incorporating stabilizer into the polyamide.

The 2-mercaptobenzimidazole stabilizers employed in the practice of this invention include 2-mercaptobenzimidazole itself and the organic or inorganic salts thereof, which may be formed in situ under conditions herein disclosed. Even small amounts of the stabilizer compositions of the present invention are effective for suppressing deterioration, i. e. for suppressing color formation, embrittlement, or both. Thus, as shown in the foregoing tables, the presence of 2-mercaptobenzimidazole alone with polyhexamethylene adipamide provides stabilization against embrittlement while not apparently inhibiting discoloration. On the other hand 2-mercaptobenzimidazole stabilizes such polyamides as polyhexamethylene sebacamide and the polyamide produced by reacting adipic acid with a stereoisomeric mixture of di(p-aminocyclohexyl) methane against discoloration. When using 2-mercaptobenzimidazole alone, at least about 1% based upon the weight of polyamide may be used to stabilize polyhexamethylene adipamide against embrittlement. Smaller amounts, however, down to 0.1% can be used to obtain appreciable stabilization of such polyamides as polyhexamethylene sebacamide. It is within the scope of the present invention to use quantities of both components outside of the ranges herein specified, but experience has shown that amounts less than the minimum quantities are usually relatively ineffectual, and quantities above the maximum amount result in no substantial further improvement in the stability of the polymers. Furthermore, excessive quantities of the phosphorus compounds cause bubbling of the polyamide compositions during molding operations.

Phosphorous and phosphoric acid are the preferred phosphorus compounds for the present stabilizer compositions. Furthermore, various other phosphorous and phosphoric compounds which are readily hydrolyzable to the acid under the conditions of the polyamide-forming reaction may be used. Other particular compounds which have been found to be effective have been mentioned hereinbefore. Potassium and sodium bromide are the preferred halogen compounds for use in the present stabilizer compositions. Greater stability against embrittlement is obtained with a given quantity of the alkali metal bromides than with the alkali metal chlorides or iodides. In general, a greater quantity of the alkali metal chlorides and iodides is required to obtain optimum stabilization. It is to be understood that hydrogen halide may be present, and is formed, at least in small quantities, in situ in certain instances, e. g. in reaction mixtures into which an ammonium halide and phosphoric acid have been introduced in dilute aqueous system.

In addition to the stabilizing action of the phosphorus compounds of the present invention it has been found that the phosphorus compounds defined herein act as catalysts in the polymerization of polyamides. This means that under comparable conditions of polymerization the intrinsic viscosity of the resulting polyamide is higher when polymerized in the presence of the herein defined phosphorus compounds than when polymerized in the absence thereof. For example, a polyhexamethylene adipamide polymerized in the presence of 0.25% of phosphorous acid, based upon the weight of polyamide, had an intrinsic viscosity of 1.30 while the same polyamide polymerized in the absence of phosphorous acid had a viscosity of 1.10. If desired, a viscosity stabilizer such as acetic acid may be used. In certain instances the stabilizers of the present invention not only stabilize against degradation of color during exposure to general atmospheric conditions, but the initial color factor of the polymer prepared in the presence of these stabilizers is appreciably lower than the initial color factor of unstabilized polymers and polymers stabilized by stabilizers known heretofore. This is highly advantageous in applications where polyamides are applied in their natural color, that is, in yarns, films, and monofilaments such as in brush bristles and tennis racket strings.

Synthetic linear polyamides which can be stabilized according to the process of this invention are all those of the nylon type having an intrinsic viscosity above 0.4 as defined in U. S. Patent 2,130,948. Furthermore, polyamides formed by reaction of a dicarboxylic acid and a stereoisomeric mixture of di(p-aminocyclohexyl) methane as embodied in U. S. Patent 2,512,606 are also included within the scope of the present invention. In addition to particular polyamides disclosed hereinbefore other polyamides included among those which may be stabilized with the compositions of this invention are as follows: polymerized 6-aminocaproic acid, polytetramethylene sebacamide, polytetramethylene adipamide, di(p-aminocyclohexyl) methane, 2,2 - di(p - aminocyclohexyl) propane, 1,2 - di(p - aminocyclohexyl) ethane, and 1,6-di(p-aminocyclohexyl) hexane. It is to be understood that interpolyamides prepared from mixtures of amino acids and dibasic acids and diamines as embodied in U. S. Patent 2,285,009 are also included within the scope of this invention.

It is to be understood that the presence of various impurities in the condensation reaction can measurably affect the initial color and color stability of the polyamide stabilized with the compositions of the present invention. For example, it has been found that a few parts of iron per million parts of the polyamide affect adversely the color stability. Various other heavy metals have similar effects. Furthermore, it is desirable that the polyamide salt be colorless prior to polymerization. This may be accomplished by decolorizing the salt with well-known decolorizing carbon compositions. In general, the temperature should be below 290° C. during polymerization for effective control of discoloration.

Improvement of the cold-drawing properties of the polyamides stabilized with the compositions of the present invention is a very valuable contribution to the art. Heretofore, it was extremely difficult, if not impossible, to cold-draw comparatively thin filaments (0.4 inch in diameter) of well-known nylon compositions by hand at room temperature. However, as illustrated in Example 4, by using a stabilizer composition comprising 2-mercaptobenzimidazole, a phosphorus compound, and a halogen compound as defined herein, the amount of 2-mercaptobenzimidazole preferably ranging between 0.15% and 0.3%, the ease of cold-drawing a thin filament (about 0.04 inch in diameter) by hand at room temperature is enhanced to a surprising degree. In general, as the diameter of a filament increases, the filament must be seasoned in hot water or other suitable medium for a considerable time before it can be cold-drawn by mechanical means. By employing the stabilizer compositions of the present invention polyamide compositions, which do not have to be seasoned before cold-drawing, can be produced. Furthermore, use of the present stabilizer compositions facilitates cold-drawing relatively large diameter filaments, which heretofore could not be cold-drawn. Obviously, this makes possible the production of mono-filaments having substantially greater tensile strength.

The compositions of this invention may be modified by the addition of other materials. Suitable modifying agents include plasticizers, resins, waxes, fillers and certain pigments. The form and use of the polyamide will determine which of these modifying agents are the more suitable.

The improved polyamides of this invention can be converted into any of the forms suitable for practical application, generally such as yarns, tire cord, bristles, fabric, molded articles, films, and coatings, for example, for filaments, textiles, wood, rubber, leather, and ceramic materials and are particularly useful in the above forms when intended to be exposed to elevated temperatures. Thus they form especially valuable textile fabrics by reason of their stability toward the high temperatures encountered in laundering, calendering, and ironing operations.

I claim:

1. A composition of matter comprising a macromolecular synthetic linear polyamide and 2-mercaptobenzimidazole said polyamide being one having recurring carbonamide groups as an integral part of the main polymer chain.

2. The composition of claim 1 in which the said polyamide is polyhexamethylene adipamide.

3. The composition of claim 1 in which the said polyamide is polyhexamethylene sebacamide.

4. The composition of claim 1 in which the said polyamide is polydi(p-aminocyclohexyl) methane adipamide.

5. A composition of matter comprising a macromolecular synthetic linear polyamide, stabilized by means of 2-mercaptobenzimidazole, and a phosphorus acid said polyamide being one having recurring carbonamide groups as an integral part of the main polymer chain.

6. The composition of claim 5 in which the phosphorus acid is phosphoric acid.

7. The composition of claim 5 in which the phosphorus acid is phosphorous acid.

8. A composition of matter comprising a macromolecular synthetic linear polyamide stabilized by 2-mercaptobenzimidazole, a phosphorus acid and a halide of the class consisting of the chlorides, bromides, and iodides of hydrogen, alkali metals, alkaline earth metals and ammonium said polyamide being one having recurring carbonamide groups as an integral part of the main polymer chain.

9. The composition of claim 8 in which the halide is potassium bromide.

10. The composition of claim 8 in which the halide is sodium chloride.

11. The composition of claim 8 in which the halide is potassium iodide.

12. The composition of claim 8 in which the halide is ammonium iodide.

13. The method for stabilizing a macromolecular synthetic linear polyamide which comprises admixing 2-mercaptobenzimidazole with at least one ingredient of said polyamide prior to polymerization thereof said polyamide being one having recurring carbonamide groups as an integral part of the main polymer chain.

14. The method of claim 13 wherein the 2-mercaptobenzimidazole is admixed with hexamethylene diammonium adipate.

15. In the method for stabilizing polyhexamethylene diamine adipamide by incorporating 2-mercaptobenzimidazole stabilizer therewith, the steps which comprise admixing the said 2-mercaptobenzimidazole with hexamethylene diammonium adipate, and thereafter converting the said hexamethylene diammonium adipate to polyhexamethylene diamine adipamide by the action of heat in an atmosphere of an inert gas.

16. The method for producing a stabilized macromolecular synthetic linear polyamide which comprises forming the said polyamide in the presence of 2-mercaptobenzimidazole and a phosphorus compound of the class consisting of phosphorus acids, their esters, and salts thereof with cationic radicals whose hydroxides are alkaline said polyamide being one having recurring carbonamide groups as an integral part of the main polymer chain.

17. The method for stabilizing a macromolecular synthetic polyamide which comprises forming the said polyamide in the presence of 2-mercaptobenzimidazole, a phosphorus compound of the class consisting of phosphorus acids, their esters, and salts thereof with cationic radicals whose hydroxides are alkaline, and a halide of the class consisting of the chlorides, bromides and iodides of hydrogen, alkali metals, alkaline earth metals and ammonium said polyamide being one having recurring carbonamide groups as an integral part of the main polymer chain.

18. In the method for stabilizing polyhexamethylenediamine adipamide by incorporating 2-mercaptobenzimidazole and phosphorous acid stabilizers therewith, the step which comprises admixing the said stabilizers with hexamethylene diammonium adipate and thereafter converting the said hexamethylene diammonium adipate to polyhexamethylene diamine adipamide by the action of heat in an atmosphere of an inert gas.

19. In the method for stabilizing polyhexamethylenediamine adipamide by incorporating stabilizers comprising 2-mercaptobenzimidazole, phosphorous acid and a halide of the class consisting of the chlorides, bromides and iodides of hydrogen, alkali metals, alkaline earth metals, and ammonium therewith, the step which comprises admixing the said stabilizers with hexamethylene diammonium adipate and thereafter converting the said hexamethylene diammonium adipate to polyhexamethylenediamine adipamide by the action of heat in the presence of an inert gas.

GELU S. STAMATOFF.

REFERENCES CITED

The following references are of record in the file of this patent:

Ritchie, "Chemistry of Plastics and High Polymers," page 116, 1949, Cleaver-Hume, London.